United States Patent [19]

Daigle

[11] 3,953,336

[45] Apr. 27, 1976

[54] DRILLING FLUID

[75] Inventor: Armand E. Daigle, Maryland Heights, Mo.

[73] Assignee: Amoco Production Company, Tulsa, Okla.

[22] Filed: Sept. 7, 1973

[21] Appl. No.: 395,329

[52] U.S. Cl. ............................ 252/8.5 A; 252/8.5 C
[51] Int. Cl.² .................................................. C09K 7/02
[58] Field of Search ........... 252/8.5 A, 8.5 B, 8.5 C, 252/8.55 R, 8.55 D

[56] References Cited
UNITED STATES PATENTS

| | | | |
|---|---|---|---|
| 2,570,947 | 10/1951 | Himel et al. | 252/8.5 |
| 3,105,046 | 9/1963 | Fischer | 252/8.5 |
| 3,319,715 | 5/1967 | Parks | 252/8.55 X |
| 3,625,889 | 12/1971 | Branscum | 252/8.5 |
| 3,696,035 | 10/1972 | Nimerick | 252/8.55 |
| 3,727,688 | 4/1973 | Clampitt | 252/8.55 |
| 3,878,110 | 4/1975 | Miller et al. | 252/8.5 |

OTHER PUBLICATIONS

Rogers, Composition and Properties of Oil Well Drilling Fluids, Third Edition, Pub. 1963, pp. 406–410.

*Primary Examiner*—Herbert B. Guynn
*Attorney, Agent, or Firm*—Arthur McIlroy

[57] ABSTRACT

Aqueous mixtures of fermentation-produced polysaccharides and cellulose derivatives such as hydroxyethylcellulose are used as drilling fluids. They exhibit low viscosity at high shear rates and high viscosity at low shear, causing them to be ideally suited for rapid drilling rates and good cuttings carrying capacity. These fluids are stable in the presence of high calcium ion and salt concentrations and can be used in drilling troublesome shale sections without hydration problems. The addition of KCl in modest amounts improves shale stabilization.

9 Claims, No Drawings

DRILLING FLUID

BACKGROUND OF THE INVENTION

Conventional clay bentonitic-type mud systems have inherent limitations that require the use of various drilling additives to control flow properties when the fluid encounters conditions in drilling operations which might detrimentally alter mud properties. These changes result in lower drilling and penetration rates and delays in drilling operations, which, in turn, increase overall drilling costs. In many cases with conventional drilling fluids, such additives only create more problems. This is due to the fact that while serving to control a specific mud property the additive may produce additional undesirable effects on the mud system. This may result from the additive being imcompatible with other components in the system, or may be due to a direct effect on mud properties. Also, such drilling fluids are adversely affected when they become contaminated with calcium compounds, potassium or sodium chlorides, etc. Thus, with high salt or calcium contamination, the effect on yield point, gel strengths, and fluid loss characteristics of such conventional muds renders the latter essentially useless unless special treatment procedures are employed. When anticipated calcium concentrations in excess of 200 ppm are predicted for a non-dispersed (bentonitic-extended polymer mud) drilling fluid, soda ash ($Na_2CO_3$), is usually recommended as a treatment to eliminate calcium. Otherwise, the calcium will react with the montmorillonite converting the clay to a calcium montmorillonite which usually results in a flocculation of clay particles and a very high fluid loss. In the case of high salt contamination, bentonite muds are usually not run. Instead, salt gel or attapulgite is used as a viscosifier. Even in the case of a prehydrated bentonite which is suddenly contaminated with salt, serious detrimental effects on flow properties result. This is particularly true in the case of highly dispersed muds. For example, the plastic viscosity decreases, the fluid loss increases, and the gel strengths increase.

Hydration of gumbo and similar shales, when drilling with water-based fluids, can become particularly troublesome. This is primarily for the reason that on contact with a water-based mud, gumbo shale tends to swell and slough into the well, often resulting in stuck pipe, and in some cases abandonment of the well itself. Frequently, oil-based or invert emulsion muds are used to control hydration of shales. These drilling fluids are expensive. Moreover, in many areas the drilled solids must be cleaned before disposal.

BRIEF DESCRIPTION OF THE INVENTION

I have discovered a drilling fluid that is essentially free of the foregoing disadvantages, said fluid having as its principal ingredients an effective amount of a polymeric mixture of a polysaccharide and a cellulose derivative, such as, for example, hydroxyethylcellulose, carboxymethylcellulose, or hydroxypropyl cellulose. The aqueous mixture—using fresh or salt water—is then brought to the desired weight by the addition of any of the conventional weighting agents, such as, for example, barite.

A drilling fluid of this general composition has good flow properties without many of the inherent limitations found in most conventional clay-type mud systems. It can withstand wide ranges of calcium and salt (NaCl, KCl) contamination with only minor changes in flow characteristics. In the case of KCl, however, I have found that in amounts of from about 10 to 20 lbs/bbl in combination with the polymeric mixture it can actually be beneficial, as may be seen in Tables V and VI below. Such drilling fluid likewise withstands effects of heat aging with little change in flow properties. A further advantage of the drilling fluid system of my invention is that the above-mentioned polymeric mixture forms a thixotropic solution with salt or fresh water that decreases in viscosity at high shear rates and returns to high viscosity at low shear rates. These characteristics give drilling fluids prepared from the aforesaid polymeric mixture low viscosity at the drill bit for maximum penetration together with outstanding chip removal and hole-cleaning properties.

Solids removal from the drilling fluid of my invention is readily accomplished at the shale shaker. Despite its high viscosity at low shear rates, this fluid has low gel strengths and typically allows efficient desander/desilter operation. I have also found that fluids containing the polymeric mixture taught herein can be prepared to prevent hydration of gumbo shale. A sufficiently high concentration of calcium ion, potassium chloride, sodium chloride or mixtures thereof will inhibit shale hydration and maintain hole-wall integrity without destroying the thixotropic characteristics of my novel drilling fluid. The latter, inhibited as stated, allows shales to be drilled and gumbo circulated out of the hole as discrete cuttings. A typical inhibited drilling fluid of my invention can be made with 70 percent seawater and 30 percent calcium chloride brine, to which has been added from 1,000 to 5,000 ppm potassium chloride.

The polysaccharide component of the polymeric mixture I employ may be selected from a number of sources. However, I ordinarily prefer to use a material designated as polysaccharide B-1459, prepared by the fermentation of a carbohydrate-containing culture medium with a strain of bacterium known as *Xanthomonus campestris* NRRL B-1459. Suitable carbohydrates are sucrose, glucose, starch and the like. This material is commercially available from the Kelco Company, San Diego, California 92123, under the trademark "Kelzan." Another polymer suitable for this purpose is the poly-(glucosylgelucan), sold under the trademark "Polytran" by the Pillsbury Company, Minneapolis, Minnesota 55402. Further information on the preparation and properties of these materials is to be found in U.S. Pat. No. 3,372,749 now U.S. Pat. No. 3,373,810, and in the *Journal of Applied Polymer Science*, Vol. 5, page 519 (1961).

Since these materials are subject to bacterial decomposition after a time, a preservative or bactericide should be added to the drilling fluid containing the polymeric mixture. Preservatives such as mercuric chloride or alkali metal chlorinated phenols, such as sodium pentachlorophenol, may be used for this purpose.

A typical polysaccharide product is that obtained as a result of the action of *Xanthomonas campestris* NRRL B-1459 upon carbohydrates. This is a polymer containing mannose, glucose, glucuronic acid salts and acetyl radicals in a molar ratio of about 2:1:1:1, respectively. Also present in lesser amounts are about 5.5 weight percent of inorganic materials plus about 0.15 weight percent each of phosphorus and nitrogen. The material in the relatively pure state is a soft, bulky powder slightly tinted by colored materials from the culture medium. It swells rapidly in the presence of small amounts of water, gradually forming a soft gel. The polymer is readily soluble in larger quantities of water. Aqueous solutions containing the heteropolysaccharide in concentrations of 1 percent by weight may range from about 500 to about 3000 centipoise at 75°F, typically 2400 centipoise, when tested in the Brookfield viscosimeter using a No. 3 spindle rotating at 30 rpm.

The hydroxyethylcellulose, carboxymethylcellulose, or hydroxypropyl cellulose, suitable for use in preparing the polymeric mixture for the drilling fluids of my invention, are commercially available. Of these, I prefer to use the type generally referred to as the higher viscosity grades, i.e., forming aqueous solutions of from 1 to 2 weight percent of the cellulose derivative, and having a Hoeppler viscosity at 68° F ranging from about 480 to about 24,000 cps.

systems employed. The hydroxyethylcellulose used in these systems had a Hoeppler viscosity of 68° F of 2,250 to 3,000 cps, and is available from Union Carbide, New York, N.Y. 10017 under the designation QP100ML, while the polysaccharide was obtained by fermentation of glucose with the organism *Xanthomonus campestris* and is commercially available as Biopolymer XB23 from General Mills, Minneapolis, Minnesota 55413.

Higher concentrations of the polymeric mixture, for example, 2 to 3 pounds per barrel, increase low shear viscosity while leaving almost unchanged the low viscosity at high shear rates. Table I, below, shows the increase in viscosity, as more of the polymeric mixture is added, to be substantial at low shear rates, but that the viscosity increase at high shear rates is negligible. The composition of the polymeric mixture used in this work consisted of 70 percent polysaccharide B-1459 and 30 percent hydroxyethylcellulose.

TABLE I

Thixotropic Characteristics of Polymeric Mixture in Fresh Water

| Polymeric Mixture Concentration lbs/bbl | YP/PV Ratio* | Viscosity (Centipoise) at Specified Shear Rate | | | |
|---|---|---|---|---|---|
| | | $20\ sec^{-1}$ | $100\ sec^{-1}$ | $1000\ sec^{-1}$ | $10,000\ sec^{-1}$ |
| 1.0 | 1.80 | 40 | 20 | 12 | 6.1 |
| 1.5 | 2.00 | 100 | 42 | 23 | 9.2 |
| 2.0 | 2.40 | 160 | 60 | 30 | 9.5 |

*Yield Point to Plastic Viscosity Ratio

Improved drilling fluids can be prepared from polymeric mixtures varying widely in amounts of polysaccharide and cellulose derivative. For example, I prefer mixtures containing from 80 percent polysaccharide and 20 percent hydroxyethylcellulose to 80 percent hydroxyethylcellulose and 20 percent polysaccharide, typically 70 percent polysaccharide and 30 percent hydroxyethylcellulose to 30 percent polysaccharide and 70 percent hydroxyethylcellulose. The concentration of this polymeric mixture may vary widely, typically from about 0.5 to about 3.0 pounds per barrel, and preferably from about 1 to about 2 pounds per barrel.

The difference in viscosities at high and low shear rates in salt water systems is even more pronounced, as may be seen from Table II, below.

TABLE II

Thixotropic Characteristics of Polymeric Mixture in Saturated Brine

| Polymeric Mixture Concentration lbs/bbl | YP/PV Ratio* | Viscosity (Centipoise) at Specified Shear Rate | | | |
|---|---|---|---|---|---|
| | | $20\ sec^{-1}$ | $100\ sec^{-1}$ | $1000\ sec^{-1}$ | $10,000\ sec^{-1}$ |
| 1.0 | 1.00 | 34 | 25 | 16 | 10 |
| 1.5 | 1.42 | 90 | 54 | 28 | 13.5 |
| 2.0 | 1.93 | 200 | 119 | 46 | 11 |

*Yield Point to Plastic Viscosity Ratio

The low shear viscosity of a solution of 1 pound of said polymeric mixture in a barrel of saturated salt water is 34 cps. By doubling the concentration, the low shear viscosity increases almost 600 percent to 200 cps. In Table II, it will be noted that the viscosities at these two concentrations of said mixture are virtually identical, i.e., 10 and 11 cps, at high shear rates ($10,000\ sec^{-1}$).

The composition of these muds is given in Table III, while their respective properties are recorded in Table IV. The drilling fluids of the present invention are referred to in the tables as "Polymeric Mixture", with the first number indicating the percent biopolymer and the second designating the amount of hydroxyethylcellulose.

DESCRIPTION OF SPECIFIC EMBODIMENTS OF THE INVENTION

The advantages of the drilling fluids of my invention are demonstrated in the tables appearing below, the first of which shows the compositions of various mud

TABLE III

| Composition of Systems: System | XB-23 ppb(4) | QP-100ML ppb | (1) Drillaid 421- ppb | (2) Drillaid 425- ppb | RD-111 ppb | Mud Wt. ppg | Bentonite ppb | Gumbo ppb | Barite ppb | Water ppb | (3) CaCl$_2$ ppb$^2$ | NaCl ppb |
|---|---|---|---|---|---|---|---|---|---|---|---|---|
| Conventional Mud No. 1 | — | — | 0.06 | 0.30 | — | 11.0 | 14.0 | 6.0 | 138 | 305 | — | — |

TABLE III-continued

Composition of Systems:

| System | XB-23 ppb(4) | QP-100ML ppb | (1) Drillaid 421- ppb | (2) Drillaid 425- ppb | RD-111 ppb | Mud Wt. ppg | Bentonite ppb | Gumbo ppb | Barite ppb | Water ppb | (3) CaCl$_2$ ppb$^2$ | NaCl ppb |
|---|---|---|---|---|---|---|---|---|---|---|---|---|
| Conventional Mud No. 2 | — | — | 0.06 | 0.30 | — | " | 14.0 | " | 138 | 305 | 1.16 | — |
| Conventional Mud No. 3 | — | — | — | — | 4.0 | " | 14.0 | " | 138 | 305 | — | — |
| Conventional Mud No. 4 | — | — | — | — | 4.0 | " | 14.0 | " | 57 | 285 | — | 100(Sat.) |
| QP-100ML No. 1 | — | 1.0 | — | — | — | " | — | " | 147 | 315 | — | — |
| QP-100ML No. 2 | — | 1.0 | — | — | — | " | — | " | 147 | 315 | 1.16 | — |
| QP-100ML No. 3 | — | 1.0 | — | — | — | " | — | " | 58 | 295 | — | 104(Sat.) |
| XB-23 No. 1 | 1.0 | — | — | — | — | " | — | " | 147 | 315 | — | — |
| XB-23 No. 2 | 1.0 | — | — | — | — | " | — | " | 147 | 315 | 1.16 | — |
| XB-23 No. 3 | 1.0 | — | — | — | — | " | — | " | 58 | 295 | — | 104(Sat.) |
| Polymeric Mixture (30/70) No. 1 | 0.30 | 0.70 | — | — | — | " | — | " | 147 | 315 | — | — |
| Polymeric Mixture (30/70) No. 2 | 0.30 | 0.70 | — | — | — | " | — | " | 147 | 315 | 1.16 | — |
| Polymeric Mixture (30/70) No. 3 | 0.30 | 0.70 | — | — | — | " | — | " | 58 | 295 | — | 104(Sat.) |
| Polymeric Mixture (50/50) No. 1 | 0.50 | 0.50 | — | — | — | " | — | " | 147 | 315 | — | — |
| Polymeric Mixture (50/50) No. 2 | 0.50 | 0.50 | — | — | — | " | — | " | 147 | 315 | 1.16 | — |
| Polymeric Mixture (50/50) No. 3 | 0.50 | 0.50 | — | — | — | " | — | " | 58 | 295 | — | 104(Sat.) |
| Polymeric Mixture (70/30) No. 1 | 0.70 | 0.30 | — | — | — | 11.0 | — | 6.0 | 147 | 315 | — | — |
| Polymeric Mixture (70/30) No. 2 | 0.70 | 0.30 | — | — | — | " | — | " | 147 | 315 | 1.16 | — |
| Polymeric Mixture (70/30) No. 3 | 0.70 | 0.30 | — | — | — | " | — | " | 58 | 295 | — | 104(Sat.) |

(1) Commercially available selective flocculant for drilled solids
(2) Commercially available fluid loss reducer
(3) 1.16 ppb CaCl$_2$ = 1,200 ppm calcium
(4) pounds per barrel
Conventional Muds No. 1 & No. 2 - nondispersed
Conventional Muds No. 3 & No. 4 - dispersed

TABLE IV

| System | XB-23 ppb | QP-100ML ppb | Calcium ppm | NaCl | AV | PV | YP | Gels | Fluid Loss cc | Cake |
|---|---|---|---|---|---|---|---|---|---|---|
| Conventional No. 1 | — | — | — | — | 19.0 | 16.0 | 6.0 | 1/7 | 8.5 | 1/32", firm |
| Conventional No. 2 | — | — | 1,200 | — | 23.0 | 8.0 | 30.0 | 28/30 | 71.0 | 12/32", soft |
| Conventional No. 3 | — | — | — | — | 11.5 | 11.0 | 1.0 | 2/2 | 10.2 | 2/32", soft |
| Conventional No. 4 | — | — | — | (Sat.) | 48.0 | 13.0 | 70.0 | 46/50 | 40.0 | 6/32", firm |
| QP-100ML No. 1 | — | 1.0 | — | — | 21.5 | 20.0 | 3.0 | 1/1 | 10.0 | 3/32", soft |
| QP-100ML No. 2 | — | 1.0 | 1,200 | — | 21.5 | 20.0 | 3.0 | 1/1 | 23.0 | 4/32", soft |
| QP-100ML No. 3 | — | 1.0 | — | (Sat.) | 25.0 | 23.0 | 4.0 | 1/1 | 10.0 | 4/32", soft |
| XB-23 No. 1 | 1.0 | — | — | — | 19.0 | 8.0 | 22.0 | 7/9 | 25.0 | 1/32", firm |
| XB-23 No. 2 | 1.0 | — | 1,200 | — | 19.0 | 8.0 | 22.0 | 7/9 | 28.0 | 2/32", firm |
| XB-23 No. 3 | 1.0 | — | — | (Sat.) | 22.5 | 16.0 | 13.0 | 7/8 | 11.0 | <1/32", firm |
| Polymeric Mixture(30/70)No. 1 | 0.30 | 0.70 | — | — | 22.0 | 19.0 | 6.0 | 2/2 | 16.8 | 3/32", firm |
| Polymeric Mixture(30/70)No. 2 | 0.30 | 0.70 | 1,200 | — | 21.0 | 18.0 | 6.0 | 2/2 | 15.2 | 2/32", firm |
| Polymeric Mixture(30/70)No. 3 | 0.30 | 0.70 | — | (Sat.) | 23.0 | 21.0 | 4.0 | 2/2 | 8.2 | 1/32", firm |
| Polymeric Mixture(50/50)No. 1 | 0.50 | 0.50 | — | — | 22.5 | 15.0 | 15.0 | 4/4 | 17.8 | 2/32", firm |
| Polymeric Mixture(50/50)No. 2 | 0.50 | 0.50 | 1,200 | — | 21.0 | 14.0 | 14.0 | 3/4 | 22.8 | 2/32", firm |
| Polymeric Mixture(50/50)No. 3 | 0.50 | 0.50 | — | (Sat.) | 24.0 | 19.0 | 10.0 | 4/4 | 13.6 | 1/32", firm |
| Polymeric Mixture(70/30)No. 1 | 0.70 | 0.30 | — | — | 19.0 | 15.0 | 8.0 | 4/5 | 22.6 | 2/32", firm |
| Polymeric Mixture(70/30)No. 2 | 0.70 | 0.30 | 1,200 | — | 19.0 | 14.0 | 10.0 | 5/5 | 22.4 | 2/32", firm |
| Polymeric Mixture(70/30)No. 3 | 0.70 | 0.30 | — | (Sat.) | 22.5 | 18.0 | 9.0 | 5/5 | 12.0 | 1/32", firm |

It will be seen from Table IV that conventional muds, both dispersed and non-dispersed, experience a large increase in fluid loss in the presence of calcium or sodium chloride. Also, their gel strength and yield point are too high to render the mud useful. Mud containing hydroxyethylcellulose only and contaminated with calcium showed a relatively high fluid loss and a gel strength not conducive to a satisfactory settling out of cuttings in the mud pit. In all mud systems of the present invention, even in the presence of high calcium and sodium chloride concentrations, the gel strength was in a very desirable range, while the fluid loss was particularly good in the presence of salt.

The properties of my polymeric mixture in salt water and the effect of such mixture and potassium chloride on shale stabilization are shown in Tables V and VI, respectively. Table VII illustrates the properties of a starch-salt clay system of the prior art normally used in areas where heaving or swelling shale is anticipated.

TABLE V

Properties of Polymeric Mixture in Salt Water

Base Mud: Saturated Salt Water
55 ppb - 80 mesh Fuson Shale

| Polymeric Mixture ppb | KCl ppb | Plastic Visc. cps | Yield Value lb/100 sq ft | Fann Gels lb/100 sq ft 10 sec | Fann Gels lb/100 sq ft 10 min | Fluid Loss cc/30 min |
|---|---|---|---|---|---|---|
| .5 | — | 7 | 1 | 0 | 0 | 19.5 |
| .5 | 15 | 8 | 1 | 0 | 1 | 16.5 |
| 1.0 | — | 12 | 5 | 1 | 1 | 16.0 |
| 1.0 | 15 | 13 | 10 | 2 | 2 | 11.0 |
| 1.5 | — | 17 | 22 | 3 | 3 | 13.0 |
| 1.5 | 15 | 18 | 24 | 3 | 3 | 8.5 |

In Table V, the properties of various amounts of polymeric mixture in saturated salt water are shown. Solids were added to bring the weight up to 10.5 lbs/gal. The Fuson shale had a methylene blue test value of 48-lb bentonite equivalent per 100 lb of shale. Potassium chloride was used because of its shale-stabilizing effect. These results show that approximately 1 lb/bbl of polymeric mixture is desirable for satisfactory viscosity and fluid loss control. The lower fluid loss with the potassium chloride is due to the fine particles of sodium chloride which precipitate on addition of potassium chloride.

TABLE VI

Shale Rolling Test with Polymeric Mixture

Base Mud: Saturated Salt Water
50 ppb −4+10 Mesh Fuson Shale

| Polymeric Mixture ppb | KCl ppb | Shale Recovered Wt % 16 hrs Mud | Shale Recovered Wt % 2 hr Fresh Water |
|---|---|---|---|
| — | — | 75.4 | 35.4 |
| — | 15 | 85.6 | 67.0 |
| .5 | — | 84.3 | 44.7 |
| .5 | 15 | 86.8 | 71.2 |
| 1.0 | — | 85.5 | 42.7 |
| 1.0 | 15 | 86.3 | 70.6 |
| 1.5 | — | 87.6 | 43.8 |
| 1.5 | 15 | 87.8 | 66.4 |

In Table VI, the effect of the polymeric mixture and potassium chloride on shale stabilization is shown. The concentration of potassium chloride was 15 lb/bbl, which is equivalent to about 20,000 ppm potassium ion. In these tests, 50 lb/bbl of Fuson shale chips (−40 +10 mesh) were rolled 16 hours in the various fluids. The shale was recovered on a 30-mesh screen, washed, dried and weighed. The recovered shale chips were then rolled for 2 hours in fresh water and again recovered on a 30-mesh screen, dried and weighed. This determines the lasting effect of the initial stabilization. In saturated salt water, 75.4 percent of the shale was recovered after 16 hours, but after 2 hours in tap water only 35.4 percent was recovered. The addition of 15 lbs/bbl of potassium chloride increased these values to 85.6 and 67.0 percent, respectively. The addition of the polymeric mixture alone to saturated salt water increased the initial recovery of shale. Improved recovery was also noted on rolling in fresh water but not as great as with potassium chloride. The combination of potassium chloride and polymeric mixture had the best shale recovery. Thus, this combination in saturated salt water is considered to be effective in stabilizing shale. The combination of the polymeric mixture and potassium chloride also aids in preventing cutting disintegration, resulting in lower solids.

TABLE VII

Effect of KCl on Lab-Prepared Salt Starch Mud

Base Mud: Saturated Salt Water
3 ppb Starch
20 ppb Salt Gel
15 ppb Bentonite
.5 Polyanionic Cellulose Derivative
3 ppb Lignosulfonate
NaOH to pH 11.0

| KCl ppb | Plastic Visc. cps | Yield Value lb/100 sq ft | Fann Gels lb/100 sq ft 10 sec | Fann Gels lb/100 sq ft 10 min | Fluid Loss cc/30 min |
|---|---|---|---|---|---|
| 0 | 12 | 10 | 7 | 24 | 28.0 |
| 10 | 12 | 13 | 11 | 32 | 36.0 |
| 20 | 11 | 10 | 10 | 30 | 34.0 |
| 50 | 11 | 13 | 12 | 30 | 42.0 |

The properties of the starch-salt clay system are shown in Table VII. Also shown in the table is the effect of potassium chloride on the properties of this type of system. The plastic viscosity and yield value of the starch-salt clay mud were about the same as those of mud containing 1 lb/bbl of polymeric mixture and 15 lb/bbl of potassium chloride. The fluid loss and gel strength of the polymeric mixture system were considerably lower than those of the conventional starch-salt clay mud. The addition of potassium chloride to the starch mud had practically no effect on the viscosity, but the fluid loss did increase.

It will be appreciated that in the foregoing description preferred drilling fluid compositions have been disclosed. Other combinations of cellulose derivatives and biopolymers may be employed to produce muds of comparable flow properties. With the polymeric mixtures referred to above, it is now possible to supply a drilling fluid in which fewer materials are needed to formulate it and to maintain it. Consequently, the drilling fluids of my invention can be furnished at less expense. In remote locations the relatively small amounts of polymer and additives can allow considerable transportation savings compared to bentonite-based muds.

I claim:

1. A drilling fluid composition consisting essentially of a member selected from the group sea water and an aqueous sodium chloride solution, from about 10 to 20 lb/bbl of KCl, and an effective amount of a polymeric mixture to increase the viscosity of said composition, said mixture consisting essentially of hydroxyethylcellulose, and a heteropolysaccharide, produced by the bacterium *Xanthomonus campestris* NRRL B-1459, said mixture ranging in composition from about 80 percent hydroxyethylcellulose and 20 percent heteropolysaccharide to 20 percent hydroxyethylcellulose and 80 percent heteropolysaccharide, the molecular weight of said heteropolysaccharide being such that a 1 weight percent solution thereof in water at about 75°F has a viscosity of about 500 to about 3,000 cps when measured in a Brookfield viscosimeter using a No. 3 spindle rotating at 30 rpm.

2. The drilling fluid composition of claim 1 wherein the hydroxyethylcellulose has a molecular weight such that a 1 to 2 weight percent solution thereof in water at 68°F has a Hoeppler viscosity of from 480 to 24,000 cps.

3. The drilling fluid composition of claim 1, wherein said mixture is employed in an amount ranging from about 0.5 to about 3.0 pounds per barrel.

4. The drilling fluid of claim 1 wherein the water employed is sea water.

5. The drilling fluid composition of claim 2, wherein the water employed is saturated with sodium chloride.

6. The drilling fluid composition of claim 3, wherein said mixture is employed in an amount ranging from about 1 to about 2 pounds per barrel.

7. The drilling fluid composition of claim 2, in which the hydroxyethylcellulose employed has a Hoeppler viscosity ranging from 2,250 to 3,000 cps.

8. The drilling fluid composition of claim 2, wherein said fluid has a calcium ion concentration of up to about 1,200 ppm and the water employed is sea water.

9. The drilling fluid composition of claim 2, wherein the composition of said mixture ranges from about 70 percent polysaccharide to 30 percent hydroxyethylcellulose to 30 percent polysaccharide and 70 percent hydroxyethylcellulose.

* * * * *

UNITED STATES PATENT OFFICE
CERTIFICATE OF CORRECTION

PATENT NO. : 3,953,336
DATED : April 27, 1976
INVENTOR(S) : Armand E. Daigle

It is certified that error appears in the above-identified patent and that said Letters Patent are hereby corrected as shown below:

Column 3, line 10, after "rpm.", add the following --Brine solutions of the polymer at similar concentrations have similar viscosities. In solution the polymer is insensitive to temperature and ionic materials.--

Column 7, line 5, "55 ppb" should read --35 ppb--.

Signed and Sealed this

Seventh Day of September 1976

[SEAL]

Attest:

RUTH C. MASON
Attesting Officer

C. MARSHALL DANN
Commissioner of Patents and Trademarks